(12) United States Patent
Wright et al.

(10) Patent No.: US 8,375,195 B2
(45) Date of Patent: Feb. 12, 2013

(54) ACCESSING MEMORY LOCATIONS FOR PAGED MEMORY OBJECTS IN AN OBJECT-ADDRESSED MEMORY SYSTEM

(75) Inventors: Gregory M. Wright, Mountain View, CA (US); Christopher A. Vick, San Jose, CA (US); Mario I. Wolczko, San Carlos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 559 days.

(21) Appl. No.: 12/398,724

(22) Filed: Mar. 5, 2009

(65) Prior Publication Data

US 2010/0228936 A1  Sep. 9, 2010

(51) Int. Cl.
*G06F 12/10* (2006.01)
(52) U.S. Cl. ............. 711/208; 711/209; 711/E12.059; 711/E12.068
(58) Field of Classification Search .............. None
See application file for complete search history.

(56) References Cited

U.S. PATENT DOCUMENTS

| | | | | |
|---|---|---|---|---|
| 5,129,083 A * | 7/1992 | Cutler et al. | ............. | 1/1 |
| 5,887,275 A * | 3/1999 | Nguyen et al. | ............. | 711/206 |
| 6,178,519 B1 * | 1/2001 | Tucker | ............. | 714/4.4 |
| 6,434,685 B1 * | 8/2002 | Sexton et al. | ............. | 711/206 |
| 2007/0162528 A1 * | 7/2007 | Wright et al. | ............. | 707/206 |

OTHER PUBLICATIONS

John L. Hennessy et al. Computer Architecture. 2003. Morgan Kaufmann. $3^{rd}$ ed. pp. 444-447 and 460-478.*
Mark Allen Weiss. Data Structures and Problem Solving using JAVA. 2002. Addison Wesley. $2^{nd}$ ed. p. 4.*
Greg Wright et al. "An object-aware memory architecture." Feb. 2005. Sun Labs. SMLI TR-2005-143.*

* cited by examiner

*Primary Examiner* — Nathan Sadler
(74) *Attorney, Agent, or Firm* — Park, Vaughan, Fleming & Dowler LLP; Mark D. Spiller

(57) ABSTRACT

One embodiment of the present invention provides a system that accesses memory locations in an object-addressed memory system. During a memory access in the object-addressed memory system, the system receives an object identifier and an address. The system then uses the object identifier to identify a paged memory object associated with the memory access. Next, the system uses the address and a page table associated with the paged memory object to identify a memory page associated with the memory access. After determining the memory page, the system uses the address to access a memory location in the memory page.

20 Claims, 8 Drawing Sheets

ACCESSING MEMORY LOCATIONS FOR PAGED MEMORY OBJECTS IN AN OBJECT-ADDRESSED MEMORY SYSTEM

BACKGROUND

1. Field of the Invention

This disclosure is generally related to the design of computer systems that support object-based memory addressing. More specifically, this disclosure is related to identifying and accessing memory pages that are associated with paged memory objects.

2. Related Art

Virtual machines can be used to emulate different hardware environments on a computing device. For instance, a virtual machine can facilitate executing programs that have been compiled for a different instruction set architecture (ISA) than that of the computing device. Moreover, two or more virtual machines that emulate different hardware environments and/or operating systems may co-exist and simultaneously execute guest programs on the same computing device.

However, managing multiple address spaces for different simultaneously executing guest programs can be complex. For example, while translating and executing guest programs, a runtime environment on the computing device needs to ensure that each given load and store instruction accesses the correct address space with the correct privileges. For instance, different load instructions may need to access memory locations associated with guest applications, guest operating systems, and/or a virtual machine's private address space (which should be invisible to the guest application or guest operating system). Precisely emulating different ISAs requires that such memory accesses be handled correctly, which can involve substantial programming effort and overhead.

Hence, what is needed is a method that facilitates accessing memory without the above-described limitations of existing techniques.

SUMMARY

One embodiment of the present invention provides a system that accesses memory locations in an object-addressed memory system. During a memory access in the object-addressed memory system, the system receives an object identifier and an address. The system then uses the object identifier to identify a paged memory object associated with the memory access. Next, the system uses the address and a page table associated with the paged memory object to identify a memory page associated with the memory access. After determining the memory page, the system uses the address to access a memory location in the memory page.

In some embodiments, the system uses the object identifier and the paged memory object to define an address space in the object-addressed memory system. The address then identifies a specific memory location in the address space which will be accessed during the memory access.

In some embodiments, the system can access one or more address spaces in a uniform manner using object identifiers and their associated paged memory objects.

In some embodiments, the system uses object identifiers and paged memory objects to access one or more guest address spaces in a virtual machine. The system can access these different address spaces without allocating and/or modifying control registers.

In some embodiments, the system receives program object code that is associated with a first hardware implementation. While translating this object code to execute on a second hardware implementation, the system identifies a memory access in the object code. The system then emits one or more instructions for the memory access that access a paged memory object in the object-addressed memory system.

In some embodiments, the system uses fields in the object identifier to specify one or more of the following: that the object identifier identifies a paged memory object; that the object identifier identifies an unpaged ("small") memory object; a privilege level associated with the object identified by the object identifier; and/or a set of permissions or access rights associated with the object identified by the object identifier.

In some embodiments, the system can pass references to guest address spaces to different program and/or system entities by using object identifiers and paged memory objects.

In some embodiments, the object-addressed memory system facilitates accessing memory locations for both paged and unpaged memory objects. When accessing an unpaged memory object, the system: 1) determines from a field in the object identifier that the object identifier identifies an unpaged memory object type; 2) uses an object table to determine a specific physical memory address associated with the unpaged memory object; and 3) uses the received address as an offset to access a memory location relative to the determined specific physical memory address.

In some embodiments, while translating the object code, the system emits a set of instructions in the object code to perform memory accesses using a privileged object identifier. Similarly, the system emits a second set of instructions in the object code to perform memory accesses using a second unprivileged object identifier. In this scenario, a first paged memory object associated with the privileged object identifier may refer to a same memory page as the second unprivileged object identifier, but with different privilege levels. Hence, two address spaces with different privilege levels can be accessed using a uniform addressing mechanism (e.g., object identifiers), thereby facilitating cross-privilege and cross-domain inlining for a virtual machine.

In some embodiments, the system accesses a translation lookaside buffer to determine a physical memory page for a memory access. This translation lookaside buffer uses data in the object identifier and the memory address to determine a page table entry associated with the object identifier and/or a physical memory page for the memory access.

In some embodiments, an unpaged memory object is limited in size to a relatively small number of fields (e.g., 1024 fields). Hence, by supporting paged memory objects, the system facilitates object-based addressing for objects larger than the maximum size of an unpaged object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices. When the hardware modules are activated, the hardware modules perform the methods and processes included within the hardware modules.

Object-Based Memory Access Techniques

Figure 1A:
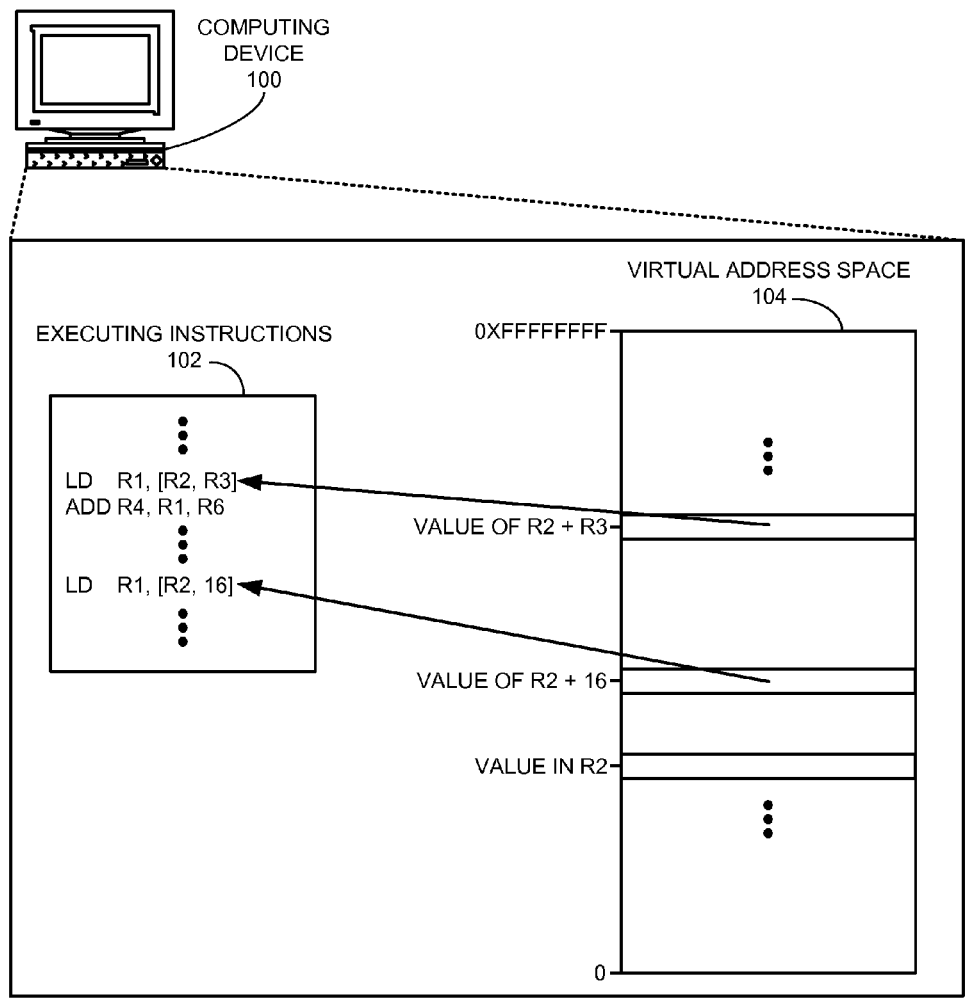
FIG. 1A illustrates accessing a conventional memory.

FIG. 1A illustrates accessing a conventional memory on a typical computing device 100. The instruction set architecture (ISA) for computing device 100 provides a set of load and store instruction formats that facilitate computing a memory address. For instance, a processor executing load (LD) instructions 102 may compute a virtual memory address by combining two values that are stored in two registers (e.g., [R2, R3] in FIG. 1A) or by combining a value in a register with an immediate value field stored in the instruction (e.g., [R2, 16] in FIG. 1A). These computed virtual memory addresses identify the locations in virtual address space 104 that should be accessed.

Figure 1B:
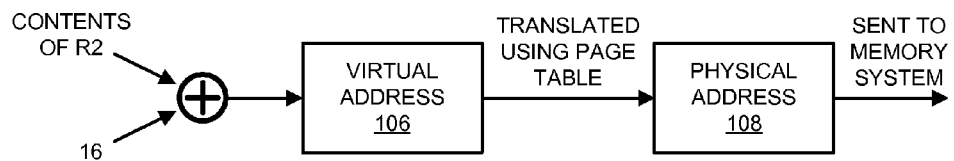
FIG. 1B illustrates the process of accessing a conventional memory.

FIG. 1B illustrates the process of accessing a conventional memory. After computing a virtual address 106 (as described for FIG. 1A), computing device 100 translates virtual address 106 to a physical address 108 using a page table. This physical address 108 can be used to directly access the physical memory of computing device 100 (e.g., to load and/or store a desired value from that memory location). Note that translating virtual address 106 to physical address 108 may involve using a page table cache, such as a translation-lookaside buffer (TLB).

Figure 2A:
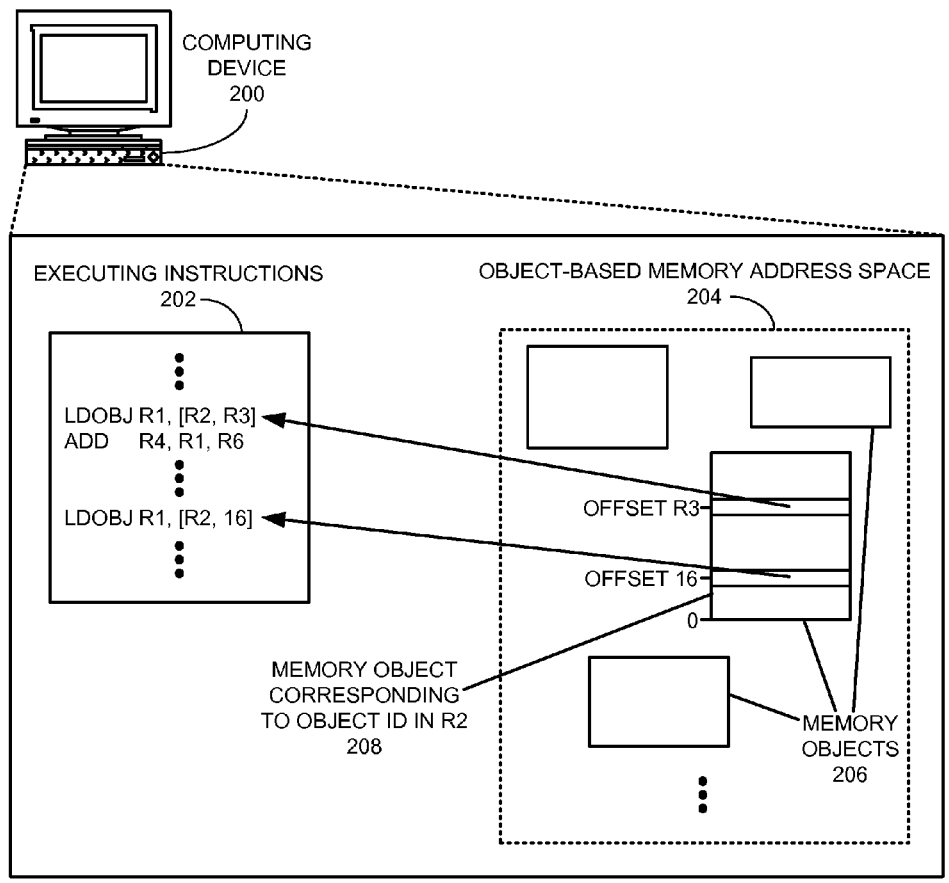
FIG. 2A illustrates accessing an object-addressed memory.

FIG. 2A illustrates accessing an object-addressed memory on a computing device 200. Note that the memory address space in FIG. 2A is an object-based memory address space 204 that can include a large number of memory objects 206, instead of the (single) flat, contiguous memory representation illustrated in FIG. 1A. This object-based representation uses a different set of load/store instructions (e.g., the illustrated LDOBJ instruction) which accept an object reference and offset, where the object reference (or object identifier (OID)) is a location-independent name for the object and the offset specifies a location in the object. For instance, executing LDOBJ instructions 202 involves using the (OID, offset) pairs from these instructions to determine a memory object and an offset into the memory object. For example, in FIG. 2A, both LDOBJ instructions specify an OID in register R2. After determining the memory object corresponding to the OID in register R2 208, the system uses the value in register R3 and the value 16 (respectively) as offsets into memory objects 206.

Figure 2B:
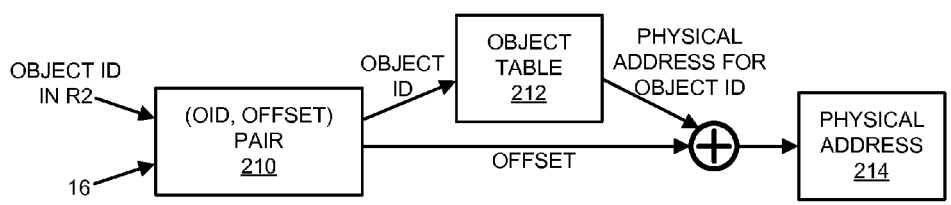
FIG. 2B illustrates the process of accessing a location in an object-based memory system.

FIG. 2B illustrates the process of accessing a location in an object-based memory system. As described above, the system receives an (OID, offset) pair 210 for an instruction. The actual physical memory addresses of objects may be tracked in an object table 212 that is indexed by OID. The system uses the OID and object table 212 to determine a base physical address for the object, and then adds the offset to this base physical address to determine the actual physical address 214 that will be accessed for the instruction.

Object-based memory addressing can build an abstraction of a large sea of small objects on top of a typical flat memory space, which can provide benefits for object-oriented environments (e.g., for a JVM™ (JVM is a registered trademark of Sun Microsystems, Inc.)). For instance, such addressing techniques can benefit heap management for object-oriented runtime environments which use a large number of small objects. However, such memory objects are typically limited in size in order to reduce the implementation cost of the associated hardware structures. The number of bits that are needed for the offset depends on the maximum object size (e.g., 10 bits of offset for a 1 KB object size), and the system may perform bounds-checking to ensure that the offset does not exceed the size of a referenced object.

Object-based memory addressing often involves special hardware support. For instance, such systems may include a specialized cache whose cache lines are tagged with OIDs and offsets (e.g., somewhat similar to a virtually addressed cache). One advantage of such a memory organization is that the system only needs to look in the object table to determine the physical address for the memory object when a cache miss occurs. Note that an object table may be much larger than a page table for a given memory size, because objects are often much smaller and more numerous than memory pages.

Some systems simultaneously support both paged and unpaged object-based addressing without using different load and store instructions for the two forms of addressing. For instance, the system may support using the same load and store instructions for both types of addressing, but differentiate small object references from paged object references using a "tag bit" (or "kind bit") in the OID operand of the load or store instruction.

In summary, object-based memory-addressing techniques can provide a useful abstraction in object-based systems, but may sometimes be limited due to limited object sizes.

Object-Based Addressing for System Virtual Machines

Some embodiments of the present invention involve using object-based memory-addressing techniques to support executing guest programs in a virtual machine.

A virtual machine can be used to emulate different hardware environments upon the physical resources of a computing device. A "system virtual machine" allows the hardware resources of a machine to be shared across one or more different virtual machines, each of which can be associated with different applications running on separate instances of operating systems. In the following description, the hardware upon which the virtual machine executes is referred to as the "native hardware," and is associated with a native instruction set architecture (ISA). A program that was originally compiled for a different set of hardware (referred to as the "original target hardware") with a different ISA (referred to as the "guest ISA") is referred to as a "guest" program (which is comprised of instructions in the guest ISA). The virtual machine executing on the native hardware attempts to exactly emulate the guest ISA. Note that in some cases, the guest ISA may not be associated with original target hardware, and may instead provide a platform-independent standard that is used for distributing hardware-independent program code.

Figure 3:
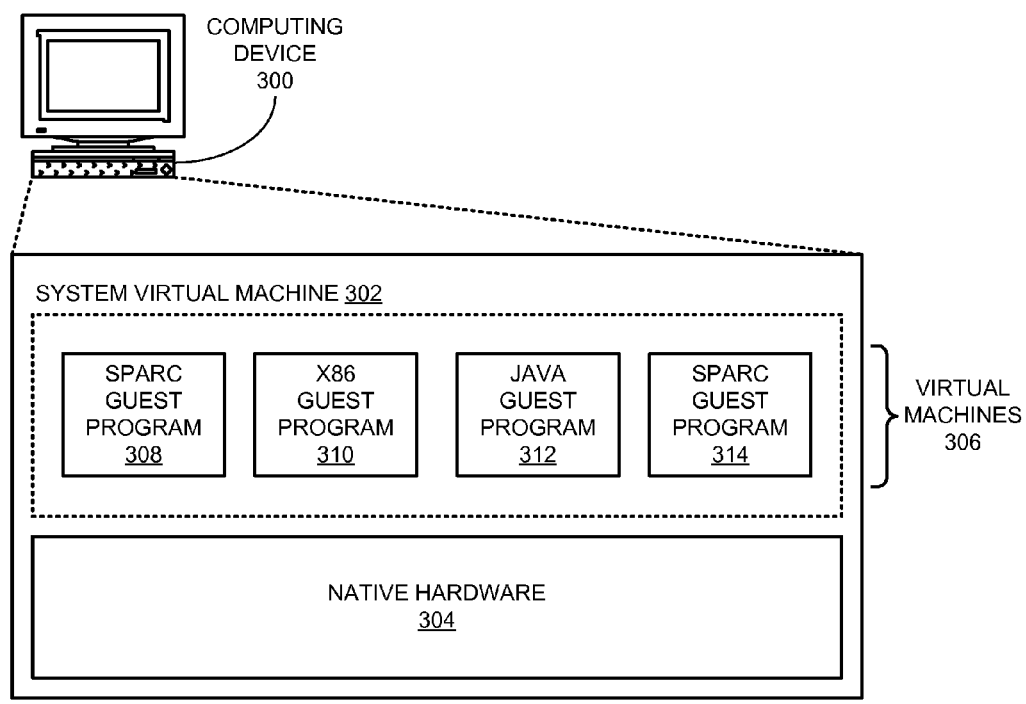
FIG. 3 illustrates a system virtual machine that allows the native hardware of a computing device to be shared across one or more virtual machines in accordance with an embodiment of the present invention.

FIG. 3 illustrates a system virtual machine 302 that allows the native hardware 304 of computing device 300 to be shared across one or more virtual machines 306. FIG. 3 illustrates a number of guest programs executing in virtual machines 306, including: SPARC® (SPARC is a registered trademark of SPARC International, Inc.) guest program 308; x86 guest program 310; Java™ (Java™ is a registered trademark of Sun Microsystems, Inc.) guest program 312; and SPARC® guest program 314.

Program instructions specified in a guest ISA typically need to be translated before they can execute in the native ISA of a computing device. This translation process can be implemented in a number of ways. For instance, an instruction set emulator can convert each instruction in the guest ISA into a set of instructions that emulate the same operation on the native ISA. Another alternative translation technique uses a dynamic compiler that: (1) analyzes larger blocks of virtual instructions in the guest program; (2) translates these blocks into an intermediate representation; and (3) compiles these intermediate representations into a sequence of optimized native ISA instructions.

Note that executing a guest program on a virtual machine can involve transferring control between different protection domains and/or address spaces. For instance, when handling a system call in a guest program, the virtual machine may need to handle the operation of transitioning from executing the guest program in "user mode" (unprivileged) to executing privileged guest operating system code. In another example, a system virtual machine may need to manage transitions for a partitioned guest program that spans multiple address spaces and/or different virtual machine types.

A dynamic compiler and/or the virtual machine(s) need to ensure that the translated stream of native ISA instructions upholds the semantics of the original target hardware, and that each particular load and/or store instruction is executed in the appropriate address space and with the correct privilege level. For instance, a given load instruction in the translated native instruction stream may correspond to either a load performed by the guest application code or a load performed by the guest operating system. Furthermore, the generated native instructions may include loads and stores that access a private address space for the virtual machine that should be invisible to the guest operating system and guest program code. Tracking these different categories of memory accesses can involve considerable overhead.

Because the dynamic compiler translating the guest program (and guest operating system) code and the virtual machine are aware of such transitions, and the native hardware executing the guest program is completely distinct from the original target hardware, the dynamic compiler can generate native code that eliminates much of the overhead associated with privilege and address space changes. For instance, the dynamic compiler and the virtual machine can be configured to perform "cross-domain inlining" by combining code from both sides of a protection domain change into one native code sequence. Alternatively, a virtual machine can also perform "cross-ISA inlining" by combining code from multiple different guest ISAs into a single native code sequence. However, performing such operations on the native hardware can also involve additional overhead. For instance, while the native hardware can be configured to use a separate address space for each separate virtual address space and/or privilege level, most ISAs allow a particular code sequence to refer to only one (or a very small number) of address spaces at a time. Because the current address space is typically identified as part of the processor context, switching address spaces and/or privilege levels is an expensive operation, and hence using multiple address spaces can result in a set of costly transitions substantially similar to those required in the original target hardware.

The above-described object-based memory-addressing techniques facilitate managing a very large number of small objects. Embodiments of the present invention extend the concept of memory objects for system virtual machines, which need to deal with many large objects (e.g., guest ISA address spaces). These embodiments involve a uniform mechanism that facilitates efficiently handling multiple address spaces within system virtual machines.

Paged Memory Objects

Embodiments of the present invention involve a system that facilitates accessing larger memory spaces (such as guest ISA address spaces) in a uniform way using paged memory objects. The system addresses these paged memory objects using an OID and an address, and the data stored for the paged memory object is not limited in size to the size of a memory page. Instead, the system uses the OID for a paged memory object to identify a page table that is associated with the paged memory object. This page table, in turn, indicates a set of memory pages that store information for the paged memory object.

In some embodiments of the present invention, accessing paged memory objects can involve: an additional set of instructions that can be used to access and manipulate paged memory objects; a different memory-addressing format that uses an OID and a virtual address to specify a location in a paged memory object; and/or additional lookup mechanisms that facilitate identifying a page table and/or other information associated with a paged memory object.

Figure 4A:
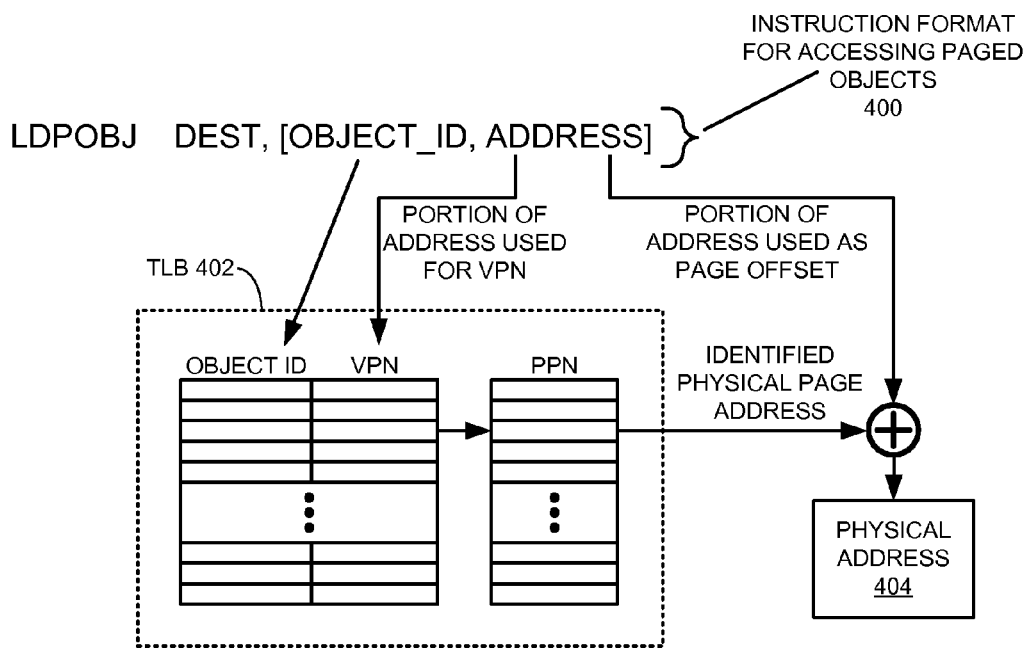
FIG. 4A illustrates an instruction format and TLB structure that facilitate accessing paged memory objects in accordance with an embodiment of the present invention.

FIG. 4A illustrates an instruction format and TLB structure that facilitate accessing paged memory objects. The instruction format 400 of the LDPOBJ ("LoaD Paged OBJect") instruction illustrated in FIG. 4A includes a memory-addressing format that identifies: a destination register (DEST); an OID (OBJECT_ID) that identifies the address space to be loaded from; and an address (ADDRESS) in the identified address space. FIG. 4A illustrates using the OID as a context identifier for TLB 402. TLB 402 tags use both the OID and a virtual page number (VPN) (derived from a portion of the (virtual) address) to look up a physical page number (PPN) during a memory access. A second portion of the address serves as the page offset, and is combined with the identified physical page address to determine the specific physical address 404 to be used by the memory system (e.g., the physical address sent to the cache) during the memory access. Note that adding an OID field to TLB 402 facilitates supporting object-based addressing without dramatically changing the infrastructure used for conventional memory accesses.

Note that TLB 402 can simultaneously hold mappings for multiple different OIDs. Hence, subsequent instructions accessing different address spaces (e.g., different paged memory objects) can co-exist in the TLB, and the system can switch address spaces without needing to flush the contents of TLB 402.

Note also that other instructions can use substantially similar addressing techniques to access paged memory objects. For instance, a STPOBJ (STore Paged OBJect) instruction may use the same addressing format to store a value to a memory location in an address space identified by an OID.

In some embodiments of the present invention, the system can distinguish between types of objects and object permissions using fields in the OID. For instance, the system can support object-based addressing for both "small" (page-sized) memory objects as well as larger paged memory objects by using a "kind" bit in the OID that distinguishes such small objects from paged memory objects. Similarly, the system can store and determine access rights and/or permission information for a given memory object (e.g., whether the memory object is read-only) using one or more bits of the OID. Such options allow the dynamic compiler and/or the runtime environment of a virtual machine to easily specify and/or determine memory object types and permissions.

Figure 4B:
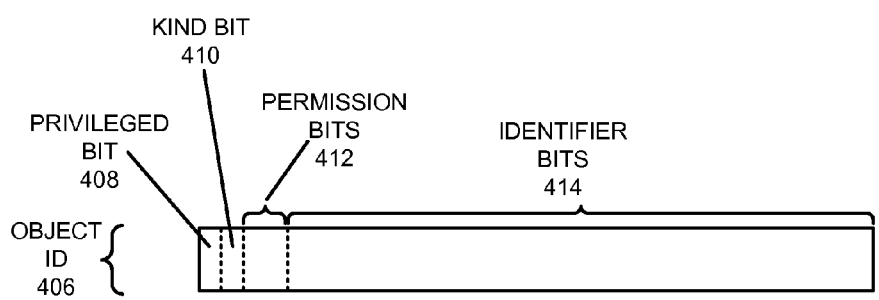
FIG. 4B illustrates the format of an exemplary object identifier in accordance with an embodiment of the present invention.

FIG. 4B illustrates the format of an exemplary object identifier 406. OID 406 includes privileged (or supervisor) bit 408 (see the following sections), kind bit 410, one or more permission bits 412 (e.g., read and write permission bits), and a number of identifier bits 414 that can be used to distinguish different OIDs. Note that in some embodiments, all of the described bits (408-414) may be used to identify an OID. For instance, in such embodiments, two OIDs with the same identifier bits 414 but a different privileged bit 408 would refer to different address spaces. In alternative embodiments, some or all of the non-identifier bits (408-412) are not used to identify an OID. In such embodiments, two OIDs with the same identifier bits 414 but different privileged bits 408 might refer to the same address space but be associated with different privilege levels for that address space. Note that the techniques described for the present invention may be adjusted slightly depending whether the system uses all of the bits (408-414) or only identifier bits 414 to distinguish OIDs. For instance, the system may use only the identifying bits of object ID 406 for indexing object tables and/or for cache tags, and not the other bits (408-412).

The above-described techniques facilitate accessing a range of memory objects (including both large, paged memory objects and small memory objects) in a uniform way. These techniques facilitate handling multiple address spaces in a uniform way by providing different OIDs for each distinct address space, and can provide a range of benefits. For instance, such uniform access capabilities can enable object-based program code that treats the (potentially very large) address space of an entire virtual machine as an object, and can read/write into this address space with the same level of abstraction as copying language-level objects or arrays. Other advantages of representing address spaces and privileges as OIDs can include the ability to pass references for entire address spaces as pointers or objects, and the possibility of writing runtime environment code that takes address spaces as arguments. For example, a memory copy ("memcopy") function can specify an address space that should be written to using an OID (which identifies both the address space as well as the privilege associated with such writes).

In some embodiments of the present invention, the system supports both object-addressed and conventional memory accesses. For instance, the system may include both object-addressed memory access instructions as well as conventional memory access instructions. For example, the conventional memory access instructions may access a "default" address space.

Accessing Page Tables for Paged Memory Objects

Determining the VPN-to-PPN mapping (e.g., when loading a TLB that supports object-based addressing on a TLB miss) involves finding the page tables associated with paged memory objects. Such page tables can take a number of forms. For instance, the system may support conventional inverted page tables and/or hierarchical page table structures. In a hierarchical page table, a top-level page table may be rooted in a single page containing pointers (e.g., 1024 pointers in a 4 KB page) that, in turn, point to additional tables. These additional tables may also point to additional tables, or may instead store PPNs. The number of levels in this hierarchical structure (and the number of entries in one table) may be adjusted based on such factors as the number of pages needed, the size of memory, and the page size.

The system can use a range of techniques to determine the page table associated with a given paged memory object. For instance, in embodiments that use a hierarchical page table for each paged memory object (e.g., for each address space), the system can use a table in memory that maps the OIDs of paged memory objects to the address of the memory pages containing their root page tables, essentially adding another level of indirection for each page table. Alternatively, the system can eliminate this additional table by storing the top-level page for the hierarchical page table in a memory object.

In some embodiments of the present invention, the system stores the page table root for a paged memory object in a corresponding small memory object that has exactly the same OID as the paged memory object, but an inverted kind bit. This organization allows the system to directly and easily determine the page table root for a paged memory object by first inverting the kind bit of the OID and then accessing the associated small memory object. Hence, the system can easily and directly access the page table root for a paged memory object without needing an additional memory table. After finding the page table root for a paged memory object, the system can browse through this page table to determine the VPN-to-PPN mapping needed (e.g., to load into a TLB entry).

Figure 5:
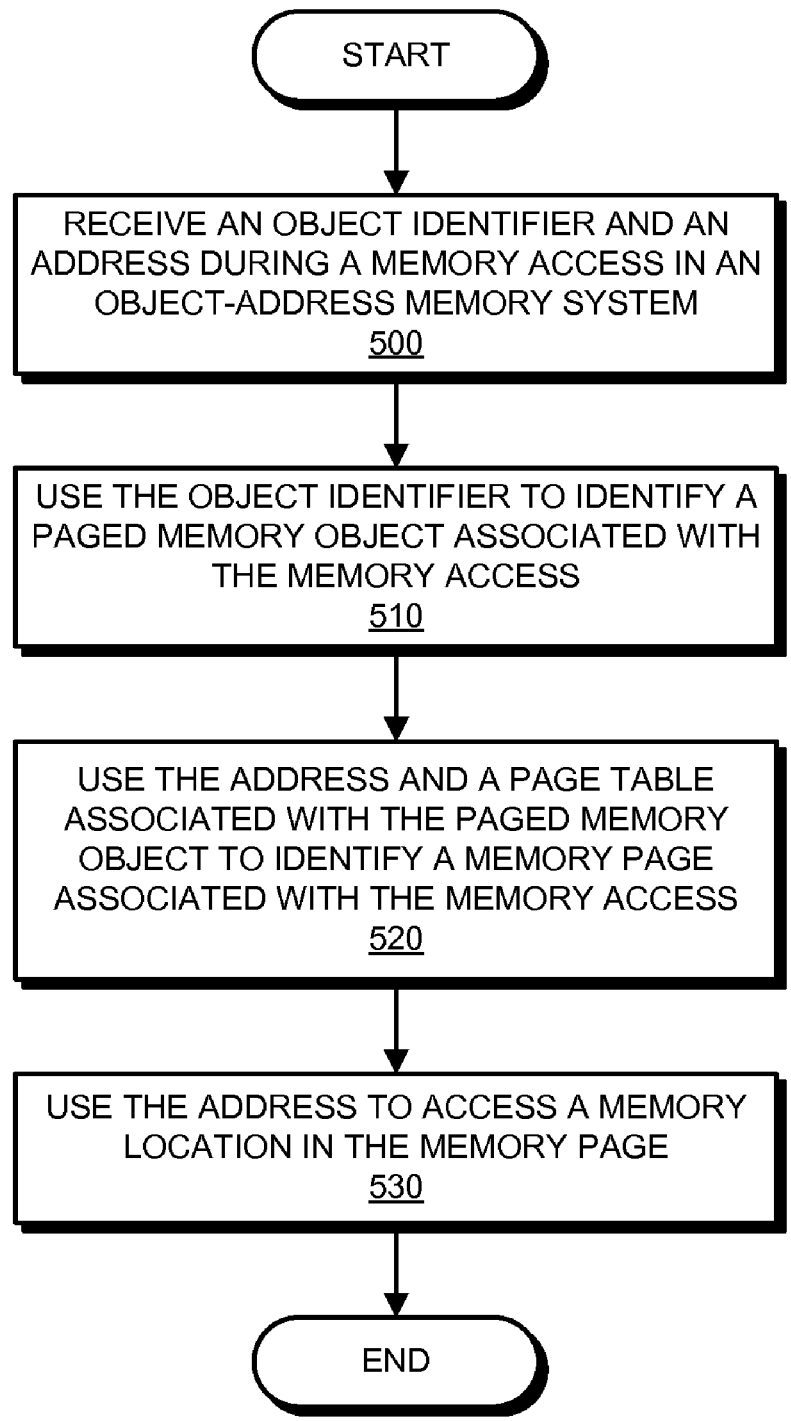
FIG. 5 presents a flow chart illustrating the process of accessing memory locations in an object-addressed memory system that supports paged memory objects in accordance with an embodiment of the present invention.

FIG. 5 presents a flow chart illustrating the process of accessing memory locations in an object-addressed memory system that supports paged memory objects. During a memory access, the system receives an object identifier and an address (operation 500). The system uses the object identifier to identify a paged memory object associated with the memory access (operation 510). The system then uses the address and a page table that is associated with the paged memory object to identify a memory page that is associated with the memory access (operation 520). After identifying this memory page, the system uses the address to access a memory location in the memory page (operation 530).

Cross-Domain and Cross-ISA Inlining Using Paged Memory Objects

As described previously, a virtual machine typically needs to constrain and enforce the permissions given to executing program code to correctly emulate the original target hardware. For instance, a virtual machine needs to determine whether to allow an instruction in the guest program to perform a privileged operation or to raise a fault. However, while the original target hardware may maintain status bits that indicate the privileges needed to access a memory page, hardware support providing such different privilege levels is typically not available for the virtual machine.

In some embodiments of the present invention, the system uses one or more bits in the OID of paged memory objects (as illustrated in FIG. 4B) to indicate a privilege level (e.g., user vs. operating system (or supervisor) privileges) which should be considered when performing load and/or store operations in an associated address space. In some embodiments, the system may separate privileged and unprivileged load and store operations into separate address spaces with different OIDs, with the privilege bits in these OIDs indicating the privilege level being used to access each respective address space. Alternatively, the system may also allow two OIDs with the same set of identifying bits (e.g., identifier bits 414 in FIG. 4B) but a different privileged bit (e.g., privileged bit 408 in FIG. 4B) to access the same address space and/or page table, but with different privilege levels. Some embodiments can include techniques that support both variants (e.g., whether or not the permission bits are considered to be identifying bits for an OID or not). For instance, the system may use two different sets of page tables to emulate the privilege distinction for the two OIDs. In this scenario, both page tables may map to (and hence share) the same unprivileged pages, but only the page table for the privileged address space maps a privileged set of pages.

Note that a dynamic compiler translating a guest program is typically aware of the different privilege levels being used by the guest program. However, because the memory addresses being accessed by a program instruction may be computed dynamically (and therefore may not be known at the time of translation), the dynamic compiler cannot determine in advance whether an instruction will attempt to access a privileged memory address. When translating the program code of the guest program, the dynamic compiler maintains the specified privilege levels of the guest program by generating object-addressed load and store instructions with OIDs whose privilege levels (and/or address spaces) match those of the guest program. During runtime, the virtual machine and/or native hardware can use the information in the OID and a target memory address to determine whether a memory access is valid or should trigger a fault. Hence, the system can use OIDs to convey to the native hardware the different privilege levels and access rights for the translated guest program.

Figure 6:
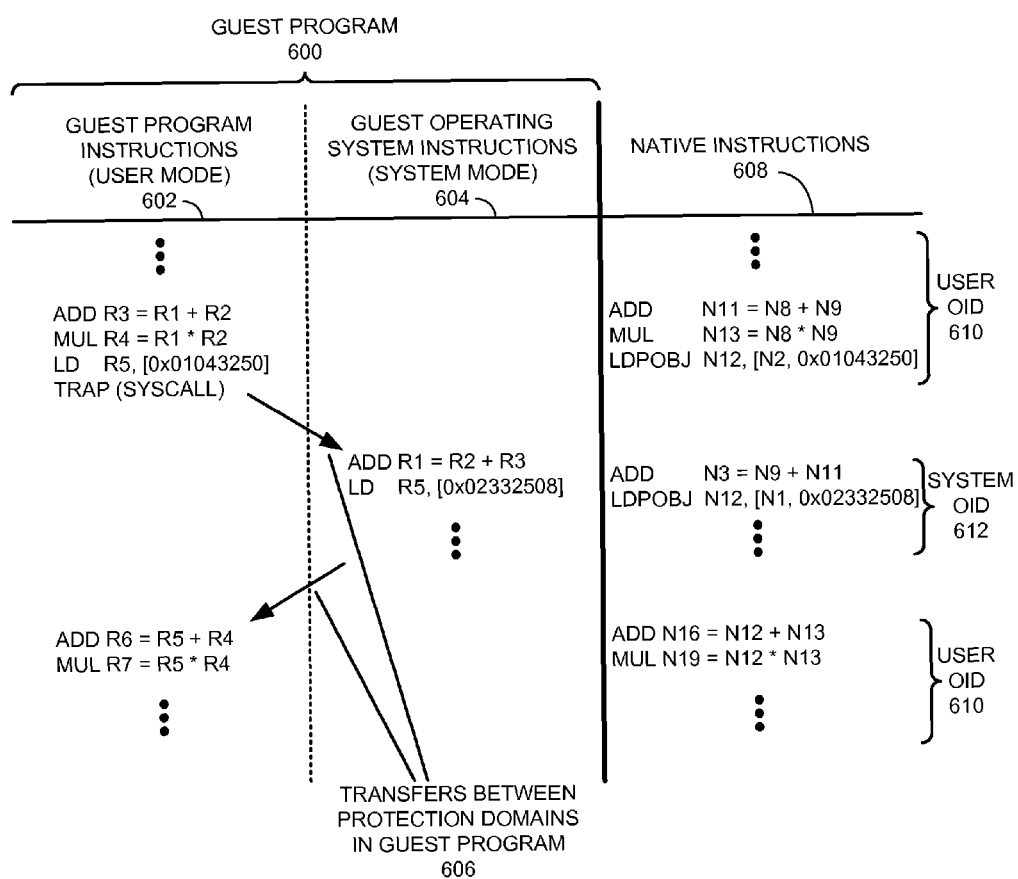
FIG. 6 illustrates a guest program that has been translated into native instructions in accordance with an embodiment of the present invention.

FIG. 6 illustrates a guest program 600 that has been translated into native instructions. The guest program includes both guest program instructions 602 that should be executed in user mode, as well as calls to the guest operating system instructions 604, which should be executed in a privileged system mode. During execution, the original target hardware manages the transfers between these two protection domains 606, which often can involve additional context switch overhead. On the native hardware, however, these transfers are handled differently, and do not involve additional context switch overhead. Instead, the dynamic compiler generating native instructions 608 inserts object-addressed load and store instructions that refer to OIDs with different privilege levels. For instance, the dynamic compiler translates load instructions that should execute in user mode into paged object loads that reference user OID 610 (which is specified in native register N2 in the LDPOBJ instruction). Similarly, the dynamic compiler generates a LDPOBJ instruction that references a system OID 612 (stored in native register N1) for a load instruction that should execute with system mode privileges.

Another example that demonstrates the benefits of paged memory objects involves using OIDs to share a translated guest program between two guest programs that (unknown to each other) use the same binary program code. In this scenario, the dynamic compiler might only compile the guest program code once, and then use separate OIDs to allow the two executing program instances to execute using different contexts (e.g., different address spaces). The system can execute the two program instances using shared code segments, but can separate their data by giving the two program instances different OIDs that identify separate contexts (e.g., access different memory pages when storing data). Hence, the system can reduce overhead and duplicated effort without risking interference between the two program instances.

Inserting object-based memory accesses into translated guest programs may cause a large number of address spaces (with different privilege levels) to be accessed in a given sequence of program code. However, the described system can execute this program code without modifying or allocating control registers, thereby eliminating the substantial overhead typically needed for transfers between protection domains. During execution, the virtual machine can detect and properly handle any memory accesses that are invalid (e.g., violate the privilege level) for the address space associated with each respective OID. By using OIDs, the system both provides a way to specify which guest program (and/or guest program component) is executing, as well as what permission should be applied for the executing instructions. Hence, OIDs and the described infrastructure facilitate emulating the privilege levels of the original target hardware both efficiently and correctly.

In some embodiments of the present invention, multiple hardware and/or software components may be involved in tracking and managing the guest processes and OIDs. For instance, aspects of the multiple address spaces and corresponding OIDs may be managed by: 1) a dynamic compiler translating the guest program code into the native ISA; 2) a runtime environment for the system virtual machine; and/or 3) one or more virtual machines (each of which respectively emulates a different set of original target hardware).

Note that the translated program code executed by the virtual machines is generated by a trusted (dynamic) compiler (which is the last entity to touch the translated program code prior to execution), and then executed in a trusted runtime environment. Because the OIDs and address spaces are managed (and protected) by these trusted components, the system can dispense with some protective measures that are required by other techniques. For instance, other techniques that allow mobile program code to carry permission or privilege information in the form of a "capability" typically involve additional checks that need to be enforced by the hardware at runtime.

Note that paged memory objects may also be used in object-based environments to extend the capacity of small memory objects. For instance, a system might use paged memory objects in a JVM™ to manage very large arrays which are too large to fit in a small memory object.

In summary, embodiments of the present invention provide a uniform addressing mechanism using paged memory objects. The system can use such paged memory objects to enable multiple memory management optimizations for a system virtual machine. For instance, the system can use paged memory objects to provide a high-level abstraction for managing and accessing address spaces for guest programs in a system virtual machine. Furthermore, the system can use paged memory objects to enable efficient cross-privilege and cross-ISA inlining.

Computing Environment

In some embodiments of the present invention, the described system can be incorporated into and/or accessed by a wide range of computing devices in a computing environment. For instance, virtual machines may be implemented on a range of computing devices, and guest programs may be transferred between such computing devices.

Figure 7:
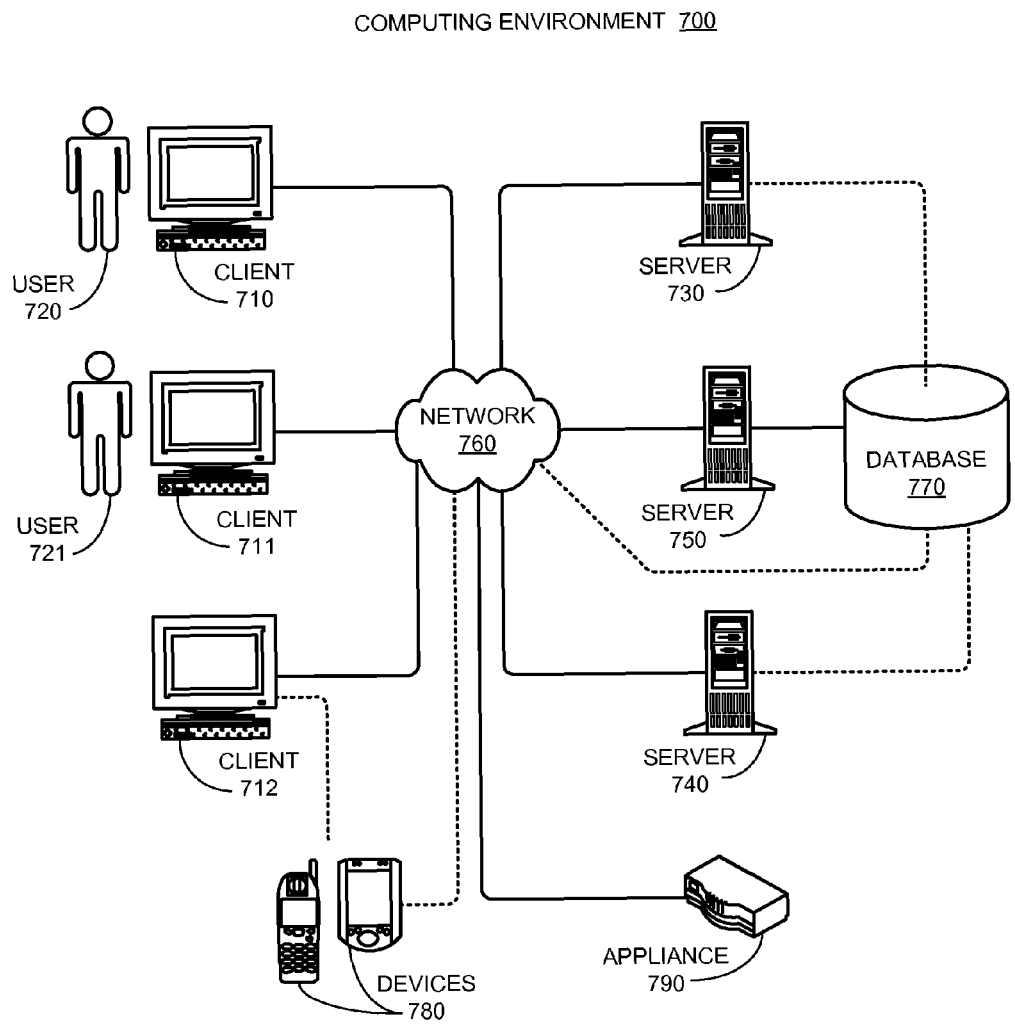
FIG. 7 illustrates a computing environment in accordance with an embodiment of the present invention.

FIG. 7 illustrates a computing environment 700 in accordance with an embodiment of the present invention. Computing environment 700 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 7, computing environment 700 includes clients 710-712, users 720 and 721, servers 730-750, network 760, database 770, devices 780, and appliance 790.

Clients 710-712 can include any node on a network including computational capability and including a mechanism for communicating across the network. Additionally, clients 710-712 may comprise a tier in an n-tier application architecture, wherein clients 710-712 perform as servers (servicing requests from lower tiers or users), and wherein clients 710-712 perform as clients (forwarding the requests to a higher tier).

Similarly, servers 730-750 can generally include any node on a network including a mechanism for servicing requests from a client for computational and/or data storage resources. Servers 730-750 can participate in an advanced computing cluster, or can act as stand-alone servers. In one embodiment of the present invention, server 740 is an online "hot spare" of server 750.

Users 720 and 721 can include: an individual; a group of individuals; an organization; a group of organizations; a computing system; a group of computing systems; or any other entity that can interact with computing environment 700.

Network 760 can include any type of wired or wireless communication channel capable of coupling together computing nodes. This includes, but is not limited to, a local area network, a wide area network, or a combination of networks. In one embodiment of the present invention, network 760 includes the Internet. In some embodiments of the present invention, network 760 includes phone and cellular phone networks.

Database 770 can include any type of system for storing data in non-volatile storage. This includes, but is not limited to, systems based upon magnetic, optical, or magneto-optical storage devices, as well as storage devices based on flash memory and/or battery-backed up memory. Note that database 770 can be coupled: to a server (such as server 750), to a client, or directly to a network. In some embodiments of the present invention, database 770 is used to store information related to virtual machines and/or guest programs. Alternatively, other entities in computing environment 700 may also store such data (e.g., servers 730-750).

Devices 780 can include any type of electronic device that can be coupled to a client, such as client 712. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 780 can be coupled directly to network 760 and can function in the same manner as clients 710-712.

Appliance 790 can include any type of appliance that can be coupled to network 760. This includes, but is not limited to, routers, switches, load balancers, network accelerators, and specialty processors. Appliance 790 may act as a gateway, a proxy, or a translator between server 740 and network 760.

Note that different embodiments of the present invention may use different system configurations, and are not limited to the system configuration illustrated in computing environment 700. In general, any device that is capable of receiving a guest program and/or executing a guest program in a virtual machine may incorporate elements of the present invention.

Figure 8:
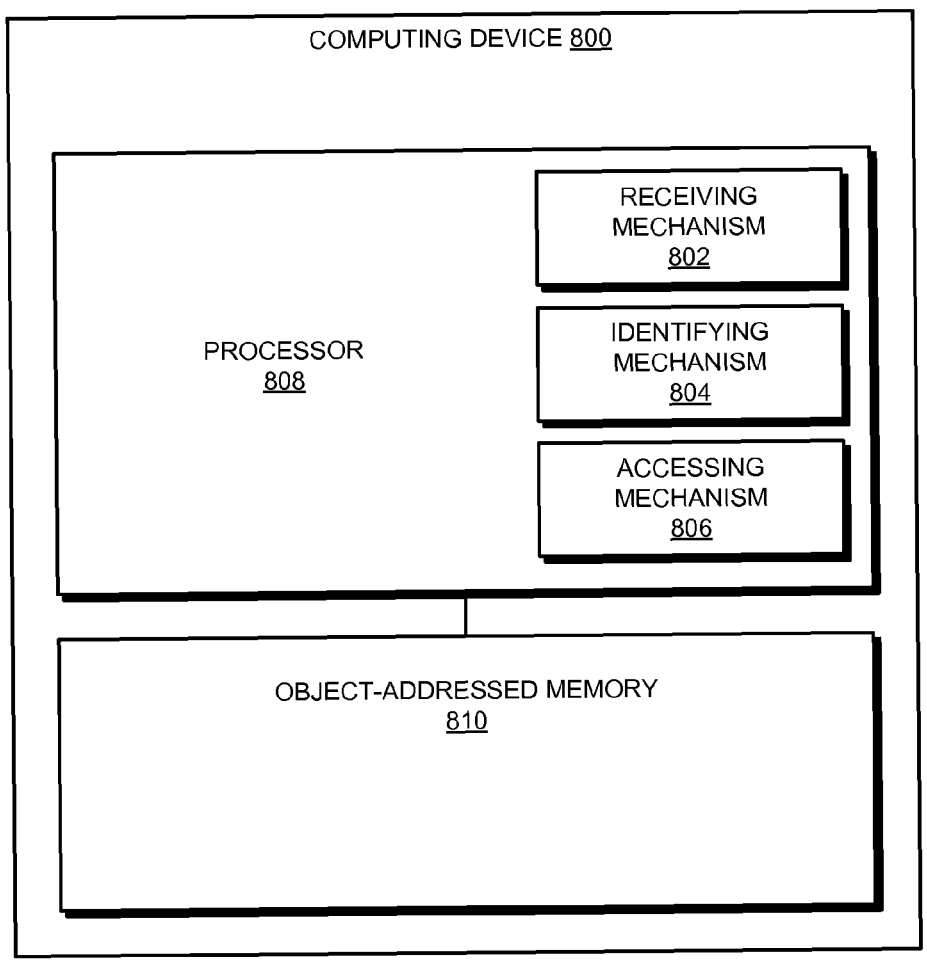
FIG. 8 illustrates a computing device that supports object-addressed memory accesses for paged memory objects in accordance with an embodiment of the present invention.

FIG. 8 illustrates a computing device 800 that supports object-addressed memory accesses for paged memory objects in accordance with an embodiment of the present invention. Computing device 800 includes processor 808 and object-addressed memory 810. Processor 808 includes receiving mechanism 802, identifying mechanism 804, and accessing mechanism 806. During an object-addressed memory access, receiving mechanism 802 receives an object identifier and an address. Identifying mechanism 804 then: 1) uses the object identifier to identify a paged memory object associated with the memory access; and 2) uses the address and a page table associated with the paged memory object to identify a memory page associated with the memory access. Accessing mechanism 806 then uses the address to access a memory location in the identified memory page.

In some embodiments of the present invention, some or all aspects of receiving mechanism 802, identifying mechanism 804, accessing mechanism 806, and/or hardware support for accessing object-addressed memory 810 can be implemented as dedicated hardware modules in processor 808. For example, processor 808 can include one or more specialized circuits for performing the operations of the mechanisms. Alternatively, some or all of the operations of receiving mechanism 802, identifying mechanism 804, accessing mechanism 806, and/or hardware support for accessing object-addressed memory 810 may be performed using general purpose circuits in processor 808 that are configured using processor instructions.

Although FIG. 8 illustrates receiving mechanism 802, identifying mechanism 804, and accessing mechanism 806 as being included in processor 808, in alternative embodiments some or all of these mechanisms are external to processor 808. For instance, these mechanisms may be incorporated into hardware modules external to processor 808. These hardware modules can include, but are not limited to, processor chips, application-specific integrated circuit (ASIC) chips, field-programmable gate arrays (FPGAs), memory chips, and other programmable-logic devices.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, program code, etc.) that configures the general-purpose circuits to perform the operations described above.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accessing memory locations in an object-addressed memory system, comprising:
    receiving an object identifier and an address during a memory access in the object-addressed memory system;
    using the object identifier to identify a paged memory object associated with the memory access by inverting a kind bit in the object identifier and using the object identifier with the inverted kind bit to access a corresponding small memory object to determine a page table root for the paged memory object associated with the memory access;
    using the address and a page table associated with the paged memory object to identify a memory page associated with the memory access; and
    using the address to access a memory location in the memory page.

2. The method of claim 1, wherein one or more fields in the object identifier can be used to specify one or more of the following:
    that the object identifier identifies a paged memory object;
    that the object identifier identifies an unpaged memory object;
    a privilege level associated with the object identified by the object identifier; or a set of permissions associated with the object identified by the object identifier.

3. The method of claim 2, wherein the method further comprises:
    using the object identifier and the paged memory object to define an address space in the object-addressed memory system; and
    wherein the address identifies a specific memory location in the address space that will be accessed during the memory access.

4. The method of claim 3, wherein the method further comprises accessing one or more address spaces in a uniform manner using object identifiers and their associated paged memory objects.

5. The method of claim 4, wherein the method further comprises:
    using object identifiers and paged memory objects to access one or more guest address spaces in a virtual machine; and
    wherein using object identifiers and paged memory objects facilitates accessing different address spaces without at least one of allocating and modifying control registers.

6. The method of claim 5, wherein the method further involves passing references to guest address spaces using object identifiers and paged memory objects.

7. The method of claim 5, wherein the method further comprises:
    receiving object code for a program, wherein the object code is associated with a first hardware implementation;
    while translating the object code to execute on a second hardware implementation, identifying the memory access in the object code; and
    emitting one or more instructions for the memory access that access the paged memory object in the object-addressed memory system.

8. The method of claim 7, wherein the object-addressed memory system facilitates accessing memory locations for both paged and unpaged memory objects;
    wherein accessing a specific unpaged memory object involves:
        determining from a field in the object identifier that the object identifier identifies an unpaged memory object type;
        using an object table to determine a specific physical memory address associated with the specific unpaged memory object; and
        using the address as an offset to access a memory location relative to the specific physical memory address.

9. The method of claim 7, wherein translating the object code further comprises:
    emitting a first set of instructions in the object code to perform memory accesses using a privileged object identifier; and
    emitting a second set of instructions in the object code to perform memory accesses using a second unprivileged object identifier;
    wherein a first paged memory object associated with the privileged object identifier and a second paged memory object associated with the second unprivileged object identifier may both refer to a common memory page, but with different privilege levels; and
    wherein a uniform addressing mechanism for guest address spaces facilitates cross-privilege and cross-domain inlining for the virtual machine.

10. The method of claim 1, wherein identifying a memory page associated with the memory access further involves:
    accessing a translation lookaside buffer to determine a physical memory page for the memory access; and
    wherein the translation lookaside buffer uses data in the object identifier and the memory address to determine the page table entry associated with the object identifier and/or the physical memory page for the memory access.

11. The method of claim 1,
    wherein an unpaged memory object is limited in size; and
    wherein using a paged memory object facilitates object-based addressing for objects larger than the limited size of unpaged memory objects.

12. The method of claim 1, wherein the page table root for a paged memory object is stored in a corresponding small memory object that has a same object identifier as the paged memory object, but an inverted kind bit.

13. A non-transitory computer-readable storage medium storing instructions that when executed by a computer cause the computer to perform a method for accessing memory locations in an object-addressed memory system, the method comprising:
    receiving an object identifier and an address during a memory access in the object-addressed memory system;
    using the object identifier to identify a paged memory object associated with the memory access by inverting a kind bit in the object identifier and using the object identifier with the inverted kind bit to access a corresponding small memory object to determine a page table root for the paged memory object associated with the memory access;

using the address and a page table associated with the paged memory object to identify a memory page associated with the memory access; and using the address to access a memory location in the memory page.

14. The computer-readable storage medium of claim 13, wherein one or more fields in the object identifier can be used to specify one or more of the following:

that the object identifier identifies a paged memory object;

that the object identifier identifies an unpaged memory object;

a privilege level associated with the object identified by the object identifier; or a set of permissions associated with the object identified by the object identifier.

15. The computer-readable storage medium of claim 14, wherein the method further comprises:

using the object identifier and the paged memory object to define an address space in the object-addressed memory system; and wherein the address identifies a specific memory location in the address space that will be accessed during the memory access.

16. The computer-readable storage medium of claim 15, wherein the method further comprises accessing one or more address spaces in a uniform manner using object identifiers and their associated paged memory objects.

17. The computer-readable storage medium of claim 16, wherein the method further comprises:

using object identifiers and paged memory objects to access one or more guest address spaces in a virtual machine; and wherein using object identifiers and paged memory objects facilitates accessing different address spaces without at least one of allocating and modifying control registers.

18. The computer-readable storage medium of claim 17, wherein the method further comprises:

receiving object code for a program, wherein the object code is associated with a first hardware implementation;

while translating the object code to execute on a second hardware implementation, identifying the memory access in the object code; and emitting one or more instructions for the memory access that access the paged memory object in the object-addressed memory system.

19. The computer-readable storage medium of claim 18, wherein translating the object code further comprises:

emitting a first set of instructions in the object code to perform memory accesses using a privileged object identifier; and emitting a second set of instructions in the object code to perform memory accesses using a second unprivileged object identifier;

wherein a first paged memory object associated with the privileged object identifier and a second paged memory object associated with the second unprivileged object identifier may both refer to a common memory page, but with different privilege levels; and wherein a uniform addressing mechanism for guest address spaces facilitates cross-privilege and cross-domain inlining for the virtual machine.

20. A computing device that includes a processor that facilitates accessing memory locations in an object-addressed memory system, wherein the processor comprises:

a receiving mechanism configured to receive an object identifier and an address during a memory access in the object-addressed memory system;

an identifying mechanism configured to:

use the object identifier to identify a paged memory object associated with the memory access by inverting a kind bit in the object identifier and using the object identifier with the inverted kind bit to access a corresponding small memory object to determine a page table root for the paged memory object associated with the memory access;

use the address and a page table associated with the paged memory object to identify a memory page associated with the memory access; and an accessing mechanism configured to use the address to access a memory location in the memory page.

* * * * *